United States Patent [19]
Martinez

[11] 3,712,726
[45] Jan. 23, 1973

[54] PHOTOGRAPHIC VIEWER

[75] Inventor: Eugene Martinez, Irvington, N.Y.

[73] Assignee: Robert H. Reibel, Croton, N.Y.

[22] Filed: March 30, 1971

[21] Appl. No.: 129,448

[52] U.S. Cl. .......................353/68, 353/78, 353/101
[51] Int. Cl. ......G03b 23/00, G03b 21/28, G03h 3/00
[58] Field of Search..........................353/68, 74–78,
353/87, 101; 40/63 A, 64 A, 70 A, 86 A

[56] References Cited

UNITED STATES PATENTS

| | | | |
|---|---|---|---|
| 3,475,091 | 10/1969 | Smitzer | 353/76 |
| 3,554,638 | 1/1971 | Dimitracopoulos | 353/68 |
| 2,276,735 | 3/1942 | Miller | 40/64 A |
| 2,258,986 | 10/1941 | Hutchison | 40/64 A |
| 1,952,249 | 3/1934 | Halloran | 353/101 |

FOREIGN PATENTS OR APPLICATIONS 683,131 10/1939 Germany..................................353/87

*Primary Examiner*—Leonard Forman
*Assistant Examiner*—A. J. Mirabito
*Attorney*—J. B. Felshin

[57] ABSTRACT

This viewer is essentially a projector with a built-in rear projection screen and uses a two-reflecting mirror system. One form of the invention is a film strip viewer, and comprises top and bottom housing sections holding all components of the optical system. The bottom housing section has means to hold both the projecting lens and one of the reflecting mirrors of the two mirror system, in two positions. In one position of the projecting lens and said one mirror in said bottom housing section, one top housing section is assembled with the bottom section to provide a film strip viewer. In another position of said projecting lens and of said reflecting mirror, an alternate top housing section may be assembled with the same bottom section to provide a viewer for slides mounted in multiple slide holders of various constructions.

15 Claims, 16 Drawing Figures

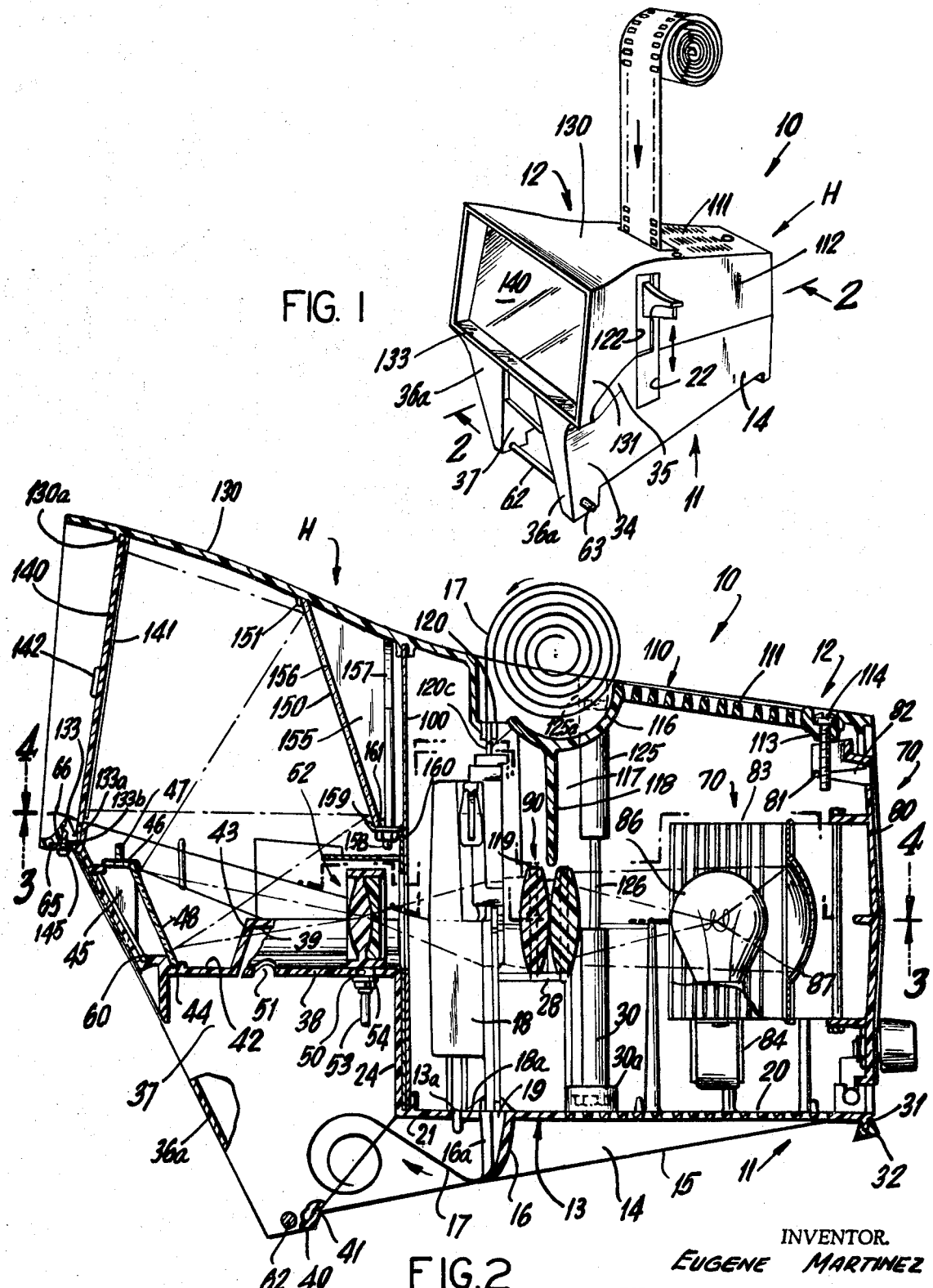

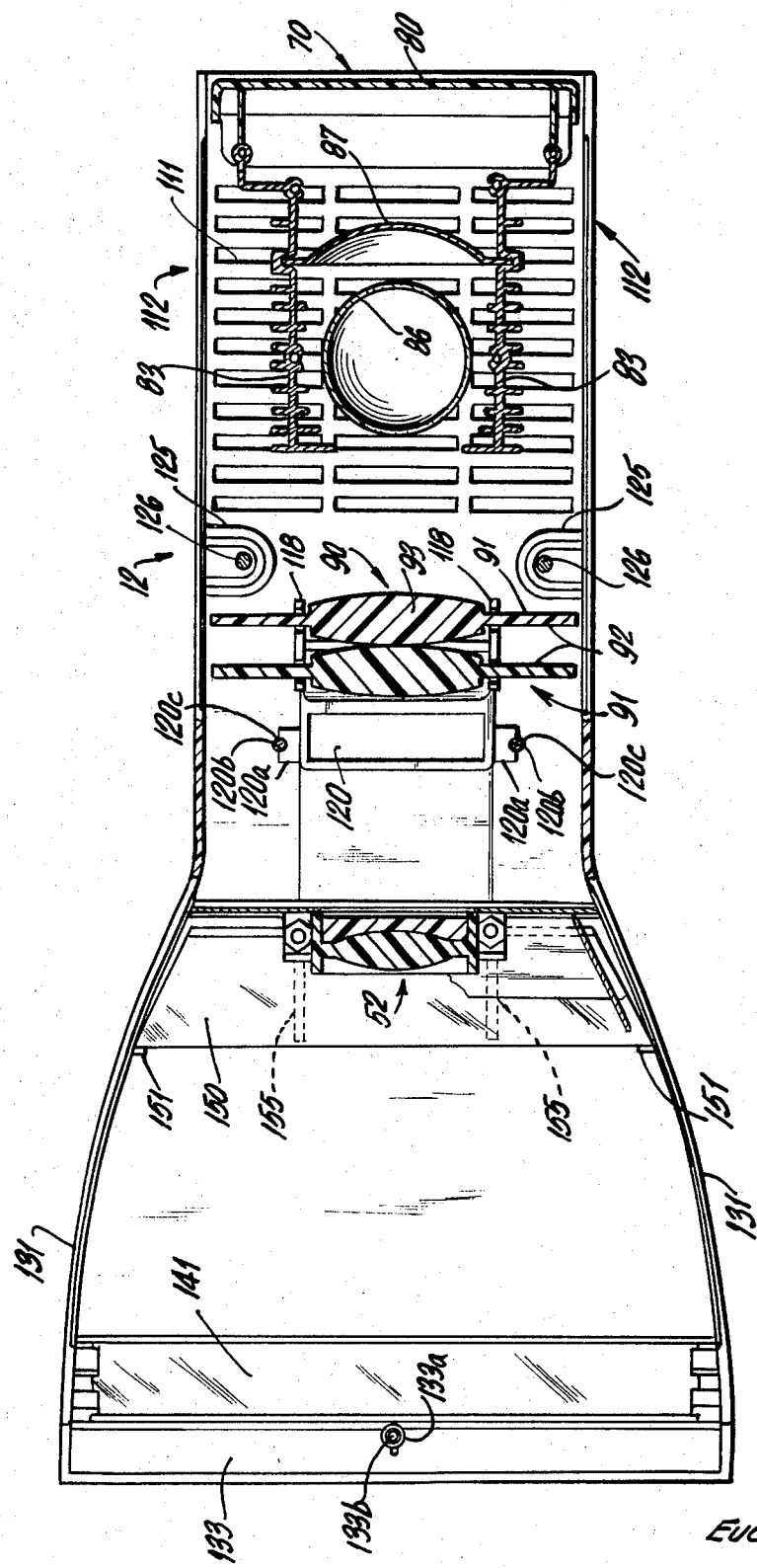

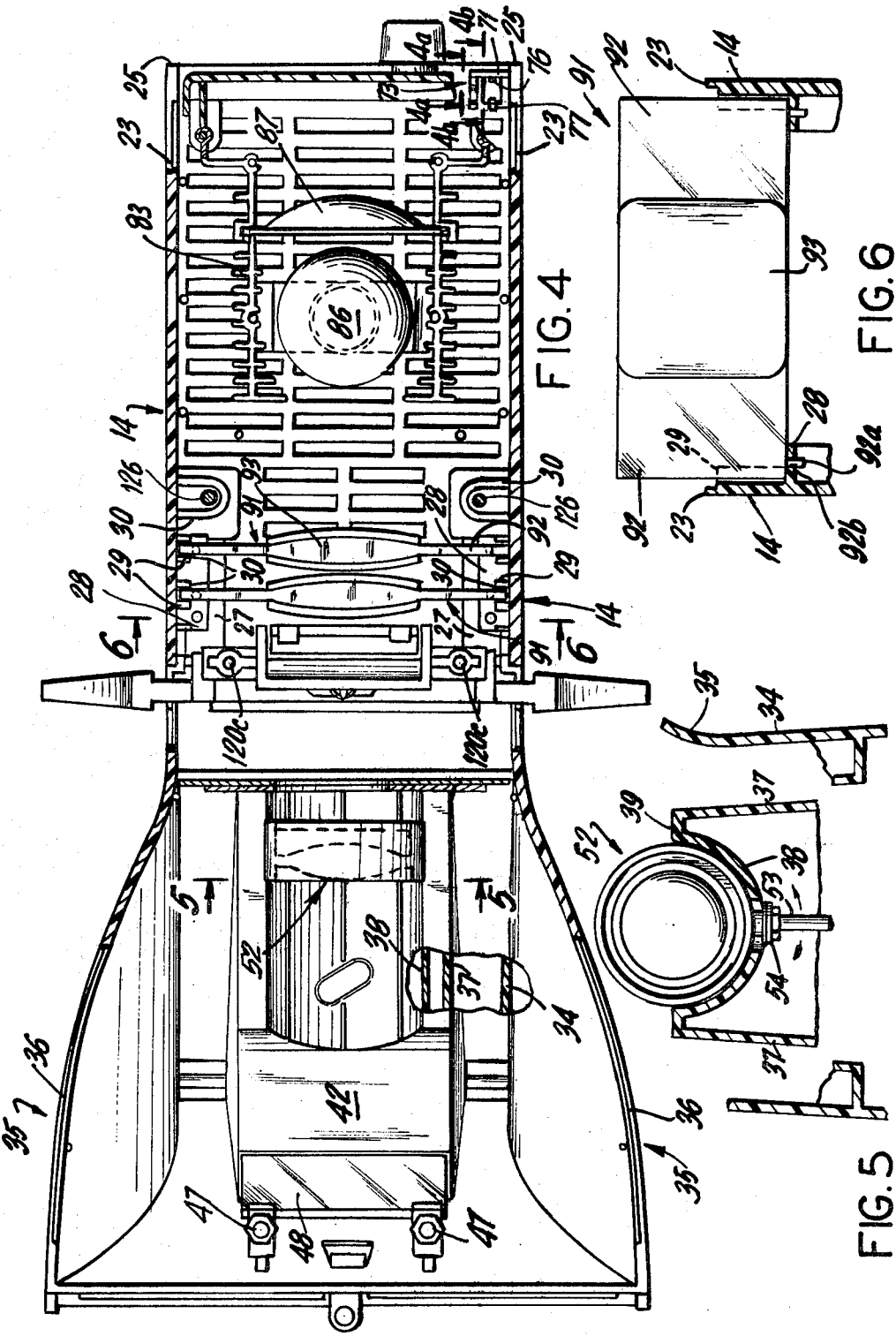

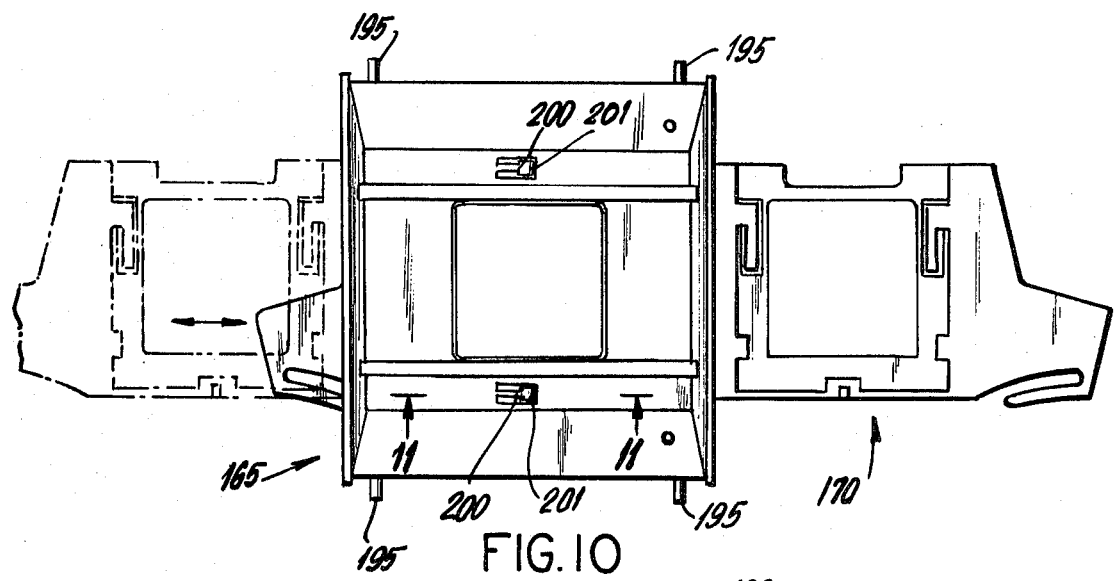
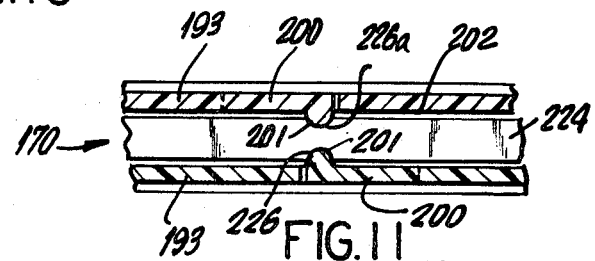
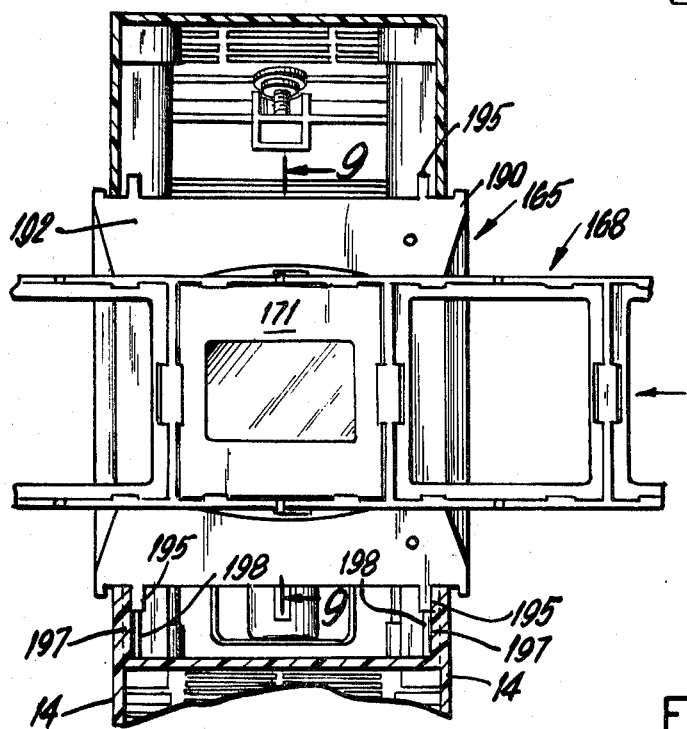
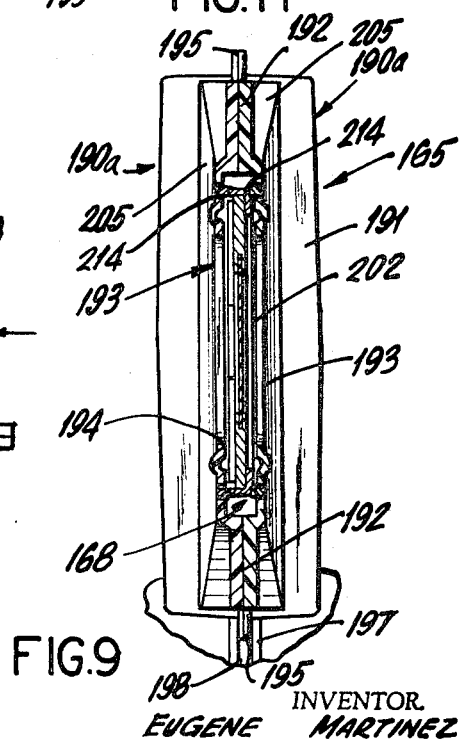
INVENTOR.
EUGENE MARTINEZ
BY
J.B. Felshin
ATTORNEY

PHOTOGRAPHIC VIEWER

An object of this invention is to provide a viewer of the character described comprising a projector with a built-in rear projection screen and using a two-mirror reflecting system.

Another object of this invention is to provide a viewer of the character described comprising top and bottom housing sections having means to hold and locate all components of the optical system. This viewer is for students of any age, for classroom, library or carrel use, for take home or one-to-one tutor use; its size, shape and light weight making it easy to use, and safe to carry.

Another object of this invention is to provide a viewer comprising a bottom housing section having means to support a projection lens assembly in alternate positions and first reflecting mirrors of a two-mirror reflecting system in alternate positions.

In first positions of said lens assembly and said first mirror, one top housing section may be assembled with said bottom housing section and with a film strip advance means, to provide a film strip viewer. In the alternate positions of said projection lens assembly and of said first mirror, a second or alternate top housing section may be assembled with said same bottom housing section and a slide holder receiver substituted for the film strip advance mechanism to provide a slide viewer. The second or alternate top housing section has a differently positioned larger second mirror and a larger screen than said elements of the first top housing section. The second top housing section is assembled with a slide holder receiver which can receive either a reciprocating two slide holder, or a long slide holder which can hold more than two slides (six slides for example). The screen of the second top housing section is larger than the screen of the first top housing section, and its reflecting mirror is sized and positioned to cooperate with the alternately positioned mirror of the bottom housing section, to project slides or transparencies. When the second top housing section is substituted for the first top housing section, the film strip advance means is also replaced by a receiver for a slide holder, in the space formerly occupied by the film strip advance means. The one slide holder receiver can, according to the present invention, accommodate either a reciprocating two slide holder or a larger multi-slide holder (which holds more than two slides).

A further object of this invention is to provide a strong and durable viewer construction of the character described which shall be relatively inexpensive to manufacture, easy to manipulate, and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention.

CLAIMS AND DESCRIPTION OF PATENT

FIG. 1 is a perspective view of a viewer embodying the invention, in the form of a filmstrip viewer;

FIG. 2 is an enlarged cross-sectional view taken on line 2—2 of FIG. 1;

FIG. 3 is a cross-sectional view taken on line 3—3 of FIG. 2;

FIG. 4 is a cross-sectional view taken on line 4—4 of FIG. 2;

FIG. 4a is a cross-sectional view taken on line 4a—4a of FIG. 4;

FIG. 4b is a cross-sectional view taken on line 4b—4b of FIG. 4;

FIG. 5 is a partial cross-sectional view taken on line 5—5 of FIG. 4;

FIG. 6 is a partial cross-sectional view taken on line 6—6 of FIG. 4;

FIG. 8 is a cross-sectional view taken on line 8—8 of FIG. 7;

FIG. 9 is a cross-sectional view taken on line 9—9 of FIG. 8;

FIG. 10 is a front elevational view of the slide holder receiver of FIGS. 8 and 9, but assembled with an alternate form of slide holder;

FIG. 11 is a partial cross-sectional view taken on line 11—11 of FIG. 10;

Figure 12:
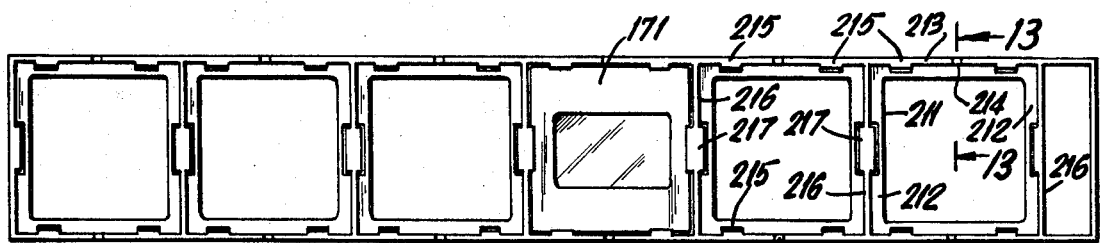
FIG. 12 is a front elevational view of the slide holder of FIGS. 7, 8 and 9.
Figure 13:
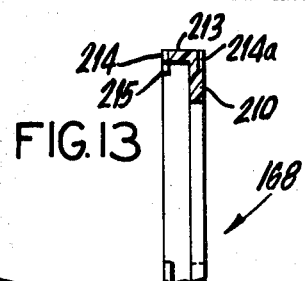
FIG. 13 is a cross-sectional view taken on line 13—13 of FIG. 12.

Referring now in detail to FIGS. 1–6 of the drawing, 10 designates a viewer embodying the invention here shown as a film strip viewer. Said viewer 10 comprises a bottom housing section 11 which interfits with a top housing section 12. Said bottom housing section 11 comprises a bottom wall 13 and side walls 14. The side walls 14 extend below bottom wall 13 and have forwardly and downwardly inclined lower edges 15. Said bottom wall 13 has a downwardly and forwardly curved guide wall 16 for guiding a film strip 17 downwardly and forwardly. The filmstrip may pass down through a film advance mechanism 18 such as shown and described in my U.S. Pat. No. 3,520,599 granted July 14, 1970. Said guide 16 has side flanges 16a spaced inwardly of side walls 14. Bottom wall 13 has a rectangular opening or slot 19 through which the film strip passes. Bottom wall 13 has holes 13a to receive downwardly projecting pins 18a on mechanism 18 to locate said mechanism and hold it in place.

The rear part of the bottom wall 13 is grilled as at 20. Said bottom wall 13 has a portion 21 disposed forwardly of opening 19 and extending to said side walls 14. Said side walls 14 have opposed rectangular slots 22 extending to the upper edges 23 of said side walls. Extending up from the front end of bottom wall 13 is a front wall 24. Said side walls 14 have rear edges 25. Said top edges 23 are parallel to bottom wall 13 and are flanged for the purpose hereinafter appearing. The portion 26 of bottom wall 13 just rearwardly of guide 16 has rectangular openings 27 adjacent side walls 14. Extending inwardly from side walls 14, above openings 27 are horizontal flanges 28 from which ribs 29 extend upwardly, forming grooves or slots 30 for the purpose hereinafter appearing. Extending upwardly from said bottom wall 13, rearwardly of ribs 29, and disposed at side walls 14 are guides 30 of horizontal U shaped cross-section, for the purpose hereinafter appearing. Extending down from the rear end of bottom wall 13 is a transverse flange 31 on which a rubber like channel 32 is frictionally fitted to act as a rear leg for the viewer.

Side walls 14 extend forwardly of wall 24, as at 34, and flair upwardly and outwardly as at 35, forming upwardly inclined and outwardly curved flanged upper edges 36. Extending from the front ends of walls 34, 35 is a front wall 36a inclined forwardly and upwardly. Extending from said front wall 36a are parallel inner vertical walls 37 which extend to the sides of wall 24. Extending forwardly from wall 24 is a wall 38 of transverse curved or semicylindrical cross-section. At the upper ends of wall 38 are top flat webs 39 joining the upper ends of walls 37. Walls 37 are connected to walls 34 by bottom webs 40, 41 which also join walls 36a, 21 and 24. At the front end of wall 38 is a flat wall 42 joining a wall 43 which extends to walls 37 and webs 39. At the forward end of flat wall 42 is a transverse groove 44. Front wall 36 has a pair of spaced hollow abutments 45 to which clips 46 are screwed by screws 47. The clips 46 are disposed at a higher level and more forwardly than groove 44. An upwardly and forwardly inclined mirror 48 has its lower edge in groove 44 and its upper edge gripped by said clips 46, for the purpose hereinafter explained. The upper end of the mirror is held against the abutments 45 by the clips 46.

Wall 38 is formed with a pair of longitudinally substantially spaced inclined slots 50, 51. A cylindrical projection lens assembly 52 is mounted on wall 38 and has a stem 53 passing down through the more rearward slot 50. A nut 54 on stem 53 is used to lock the assembly 52 in place. By loosening the nut, the assembly can be rotated to finely adjust its longitudinal position. By removing the nut 54, the assembly can be removed and mounted at the more forward slot 51 for the purpose hereinafter explained.

Figure 7:
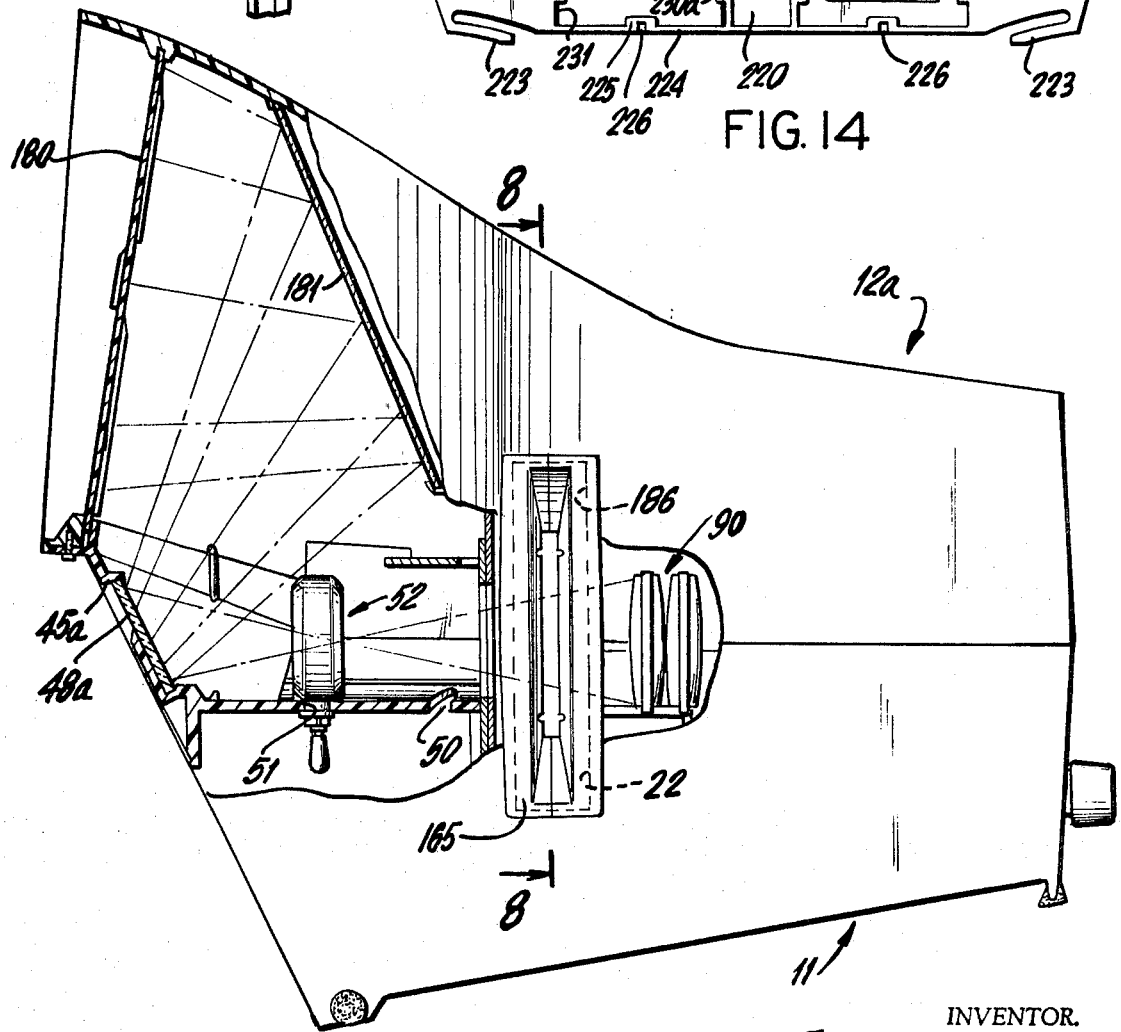
FIG. 7 is a side elevational view, with parts broken away and in cross-section, illustrating the invention in the form of a slide viewer, with the top housing section of FIG. 1, replaced by an alternate top housing section, and the film strip advance means of FIG. 1 replaced by a slide holder receiver and slide holder.

The mirror 48 can be removed from the position shown in FIG. 2 and said mirror can be replaced by another mirror 48a (FIG. 7) slid between abutments 45 and beneath a central hook 45a integral with front wall 36. The front wall 36 has a groove 60 on which the lower edge of mirror 48a may rest. FIG. 7 shows the bottom housing section assembled with a different top section 12a for viewing slides, as will be explained hereinafter. It will be noted that when mirror 48a is used, and top housing section 12a is also used, the assembly is in its more forward position, as shown in FIG. 7. Mirror 48a is held at a different angle than mirror 48 of FIG. 2 to reflect an image upwardly and rearwardly at a different inclination than is reflected by mirror 48.

At the lower front ends of walls 34 is a transverse pin 62 carrying rubber like sleeves 63 at its outer projecting ends, serving as front legs for the viewer.

At the central upper end of front wall 36 is a forwardly projecting tab 65 formed with a hole 66 for the purpose hereinafter appearing.

Means is provided to releasably and hingedly mount a lamp assembly 70 to the rear end of the bottom wall 13. To this end, there is integrally molded with the bottom wall 13, adjacent its rear edge, and at each side wall 14, a vertical transverse wall 71 having a top horizontal edge 72 and disposed at right angles to wall 14 in closely spaced relation to the rear edge of the bottom wall. The height of wall 71 is about one-half inch. Extending longitudinally from the inner end of said wall 71 is a wall 73 formed with a notch 74 which is semicircular at its lower end as at 75. At the upper end of the inner surface of wall 71 is a bump 76 which extends forwardly and is located above semi-circular notch edge 75. Extending up from wall 13 and disposed between wall 73 and outer wall 14, is an integral spring finger 77 formed near its upper end with a rearwardly facing bump 78 disposed opposite to and vertically aligned with bump 76. This structure is the same at both walls 14, but symmetrically disposed.

The lamp assembly 70 may be substantially similar to the lamp assembly disclosed in my U.S. Pat. No. 3,520,599. Said lamp assembly 70 comprises a back wall 80 of plastic material formed at its lower corners with notches to receive parts 71, 73 and with horizontal outwardly extending pintles 81 which can be moved down between bumps 76, 78 to flex the upper ends of fingers 77 forwardly to permit the pintles to pass through the space between said bumps and into the notches 74 to rest on the semi-circular edges 75 for hinging the assembly for movement between a vertical closed operative position of the lamp assembly, rearwardly through an angle of about 90° to an open, inoperative, substantially horizontal position of the back wall 80 to facilitate replacing a lamp on the assembly, to be described hereinafter. At the upper end of back wall 80 is a forwardly extending top wall 81 formed with a central slot 82 terminating short of the front edge of said top wall, for the purpose hereinafter appearing. Mounted on the back wall 80 are aluminum, ribbed, parallel, spaced, heat dissipating baffle walls 83. The lower ends of said walls 83 are interconnected by a transverse strap 84 carrying a lamp socket 85 disposed centrally between said walls to receive the base of a lamp 86. Appropriate electrical wiring for the socket is provided, but is not shown. Mounted on said spaced walls and disposed rearwardly of said lamp is a concave reflector 87, to reflect light forwardly.

Mounted on the bottom housing section 11 is a condenser lens assembly 90. Said assembly 90 comprises a pair of lens members 91 having flat wings 92 received in grooves 30 and resting on flanges or ledges 28, and central lens portions 93 (FIG. 6). At the lower edges of wings 92 are pegs 92a received in holes 92b in the flanges at ledges 28. The lens assembly 90 is disposed just behind the film advance mechanism 18, which mechanism includes means to register each frame of the film strip 17 one at a time, with the lenses 93. The rays from condensing lens assembly 90, pass through the film advance mechanism to the projecting lens assembly 52 to the mirror 48.

The filmstrip 17 is fed downwardly in upside down and backward condition. The lenses and two mirror system will project the image on a screen in correct position for viewing, as will appear hereinafter.

A dark cardboard, light shield 100 of usual construction surrounds the projecting lens as shown in the drawing.

The top housing section 12 is complementary to and interfits with the bottom housing section 11 to form a housing H. Section 12 comprises a top wall 110 having a rear grilled part 111 inclined somewhat forwardly and upwardly relative to bottom wall 13. Extending down from the top wall 110 are side walls 112. At the rear end of top wall portion 111 is threaded hole 113 into which a screw 114 is screwed. When the lamp assembly is in closed position, the lower shank of screw 114 passes down through notch 82 to hold the lamp assembly in operating position. The screw can be unscrewed to permit the assembly to be swung back to facilitate replacing the lamp 86. The lamp assembly can be easily assembled or disassembled from the bottom section due to the snap-in fit of pintles 81 in notches 74. Extending from the front end of grilled part 111 of the top wall 110 is a downwardly and forwardly curved wall 116 in which the upper rolled portion of film strip 17 rests. Projecting down from curved wall 116 are a pair of parallel, spaced flanges 117 connected by a central transverse web 118. Webs 117 have aligned pairs of notches 119 engaging upper edges of wings 92 of lens members 91 to hold them down in vertical positions on flanges 28.

At the forward end of curved wall 116 is a transverse slot 120 through which the film strip 17 passes down into the film advance mechanism 18, near the opposite ends of slot 120 are posts 120a formed with half round grooves 120b receiving locating pins 120c projecting upwardly from mechanism 18 to position the upper end of said mechanism.

Side walls 112 have aligned rectangular notches 122 which register with notches 22 to accommodate the film advance mechanism 18. The lower end edges of side walls 112 are flanged to match with the upper flanged edges of the side walls of the bottom housing section 11.

At the inner sides of the side walls 112 are integral guide channels 125 which align with a guide channels when the top and bottom housing sections are interfitted. Bottom wall 13 has upwardly recessed sockets 30a at the lower ends of channels 30 and top wall 110 has downwardly recessed sockets 125a. Bolts 126 passes through said channels and through appropriate openings in in the recessed sockets 30a, 125a, with the heads of bolts in sockets 125a, and with nuts in the sockets 30a, to fix the housing sections together.

Top wall 110 has a wall portion 130 which inclines upwardly and forwardly from top wall portion 111 and increases in width, with a flair similar to the increase in width of the bottom housing section. Extending down from top wall portion 130 are side wall portions 131 which form extensions of side wall portions 112 and follow the outward flair of the upper end edges 36 of side wall portions 35 of the bottom section.

The lower front ends of side walls 131 are interconnected by a transverse flange 133 which with the front ends of side walls 131 and top wall portion 130, forms a rectangular frame for a rectangular viewing screen 140. At the inner sides of side walls 131 are bezels 141 to back up the screen which can be slipped upwardly from the rear side of transverse flange 133. At the underside of top wall portion 130 is a grooved transverse portion 130a receiving the upper edge of the screen. Lips 142 extend, integrally inwardly from opposite side walls 131 in planes parallel to the bezels 141, to contact the front surface of the screen 140 to hold the screen in its proper position, transverse portion 133 rests on tab 65 of the bottom housing section, when the housing sections are interfitted. Said transverse portion 133 is formed with a central boss 133a registering with tab 65. Said boss has a screw threaded hole 133b to receive a screw 145 passing through a hole 66 in tab 65 to lock the front portions of the housing section 11, 12, together.

The screen 140 slopes upwardly and rearwardly. The second mirror of the two mirror reflecting system is mirror 150 which receives reflections from mirror 48 and reflects the image to the screen 140. Mirror 150 is wider and taller than mirror 48. Screen 140 is wider and taller than mirror 150.

Means is provided to support said mirror 150. To this end, there is integrally formed with top wall portion 130, at its underside, and at the inner sides of side wall portions 131, a pair of lugs 151 to engage the upper edge of the mirror 150 at the outer ends of said upper edge. Integrally formed with said top wall portion 130 are a pair of triangular, parallel webs 155 having forwardly and upwardly inclined edges 156 contacted by the backs of the mirror 150. The rear ends of said webs 155 are interconnected by a transverse web 157. At the lower ends of the rear edges of said webs 155 are threaded, downwardly extending screw threaded pins 158 on which clips 159 are mounted. Nuts 160 hold the clips 159 in place to engage the lower edge 161 of mirror 150.

The angles of mirrors 48 and 150 and of screen 140 are such as to project the image on the film strip 17 to the screen.

Figure 14:
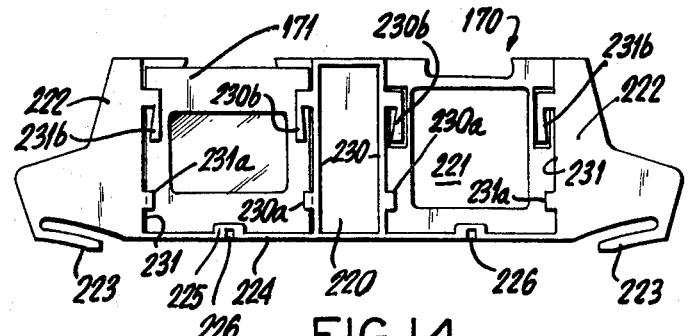
FIG. 14 is a front elevational view of the slide holder of FIGS. 10 and 11.

The bottom housing section 11 can be assembled together with the other top housing section 12a by first removing top housing section 12 and replacing mirror 48 by mirror 48a set in its position shown in FIG. 7, and replacing the film advance mechanism 18 by a mechanism 165 to accommodate and receive either the slide holder 168 of FIGS. 8, 9, 12, 13, or the slide holder 170 of FIGS. 10, 11 and 14.

The slide holder 168 is for holding a greater number of slides 171. The slide holder 168 as illustrated, holds six slides 171, by way of example. It can hold more or less slides by changing its length. The slide holder 170 can hold only two slides 171 and is reciprocated back and forth, side ways in the receiver 165.

The top housing section 12a differs from top housing section 12 in the following respects. Top housing section 12a does not have depressed, curved wall 116 or slot 120 since no film strip is to be used therewith. The rear end of top housing section 12a is very much like the rear end of top housing section 12. The front end of top housing section 12a is however wider and taller than the front end of section 12, to accommodate a rectangular screen 180 which is wider and of greater height than the screen 140.

The second mirror 181 of section 12a is wider and of greater height than mirror 150. The angles of the screen 180 and of mirrors 48a and 181 is such as to project an image from slides 171 in either slide holder 168 or 170 onto the screen 180. Furthermore, to use the viewer for slide 171, the projection lens assembly is mounted in slot 51 instead of slot 50. The positions of the projection lens assembly 52 may be finely adjusted when used with either slot 50 or slot 51 by turning the peg or pin 53 and rotating the assembly.

Top housing section 12a has notches or slots 186 similar to notches 122 of top housing section 12.

The slide holder receiver 165 fits into the registering notches 22, 186 of the side walls of top and bottom sections 11, 12a. Said receiver 165 comprises a member 190 having a pair of parallel similar end flanges 191 interconnected by top and bottom transverse portions 192. Between said top and bottom portions 192 are spaced walls 193 formed with square window openings 194 of a size to expose a transparency or slide. Said member 190 may be made of two identical molded parts 190a attached together at a common meeting plane therebetween. This is done by first turning one part around 180°, relative to the other, about a vertical axis from right to left. The two parts are adhered together along a central plane perpendicular to FIG. 9. Extending up from upper portion 192, and down from lower portion 192 are pairs of pins 195. At the inside of side walls 14 are integrally molded ribs 197 formed with half round grooves 198 to receive said pins. The spaced walls 193 form a through passage 202. Each part 190a is symmetrical with respect to a central vertical plane at right angles to said part, except for horizontal spring fingers 200 extending in one direction and having bumps 201 projecting into the through passage 202 (FIG. 11), formed between walls 193. Said bumps are at the center between the flanges 191 in opposed relation. When the two parts 190a are adhered together, the fingers 200 on one part 190a extend to the right and the fingers 200 on the other part extend to the left.

Said parts 190a are also symmetrical about a central horizontal plane passing through the said parts, to facilitate assembling pairs of parts for adherence to each other. There will always be two pins 195 projecting downwardly.

The flanges 191 are located outside the side walls 14 of the bottom housing section and extend beyond the edges of the notches 22, 186. Interconnecting flanges 191 with walls 193 and with the ends of the inner edges of parts 192, are flaring or inclined walls 205 to form flaring mouths or entrances to the through passage 202 through which the slide holder 168 passes step by step to align various slides 171 with the window openings 194 in the receiver 165. Thus the slide holder 168 can be easily inserted from either the left side or the right side of the receiver 165.

The slider holder 168 (FIGS. 8, 9, 12, 13) may be made as a plastic molding. It comprises a wall 210 formed with a plurality of square openings 211 providing wall portions 212 between said openings. Extending from wall 210 to one side thereof are top and bottom flanges 213 formed with notches 214 centralized with respect to each opening 211. At opposite sides of each notch 214, flanges 213 are formed with lips 215, parallel to and spaced from wall 210. At the rear of wall 210, notches 214a are formed in alignment with notches 214 and similar thereto. Each wall portion 212 is provided with a central rib 216. Extending from each rib 215 are lips 217 extending to opposite sides thereof and disposed in the plane of lips 215 and parallel to wall 210.

A slide 171 can be fitted in front of each window to be held in place by wall 210, wall portions 212, flanges 213, ribs 216, and lips 215, 217. The slides can be snapped past the lips. When slide holder 168 is inserted in the receiver, the bumps 201 on the spring fingers 200 will snap into notches 214 to releasably register the slides with the lenses.

The slide holder 170 may also be made as a plastic molding. Said slide holder 170 comprises a wall 220 having two square openings 221 for slides 171. At the ends of wall 220 are thickened end portions 222 provided with downwardly and inwardly curved spring fingers 223. Wall 220 has a lower horizontal flange 224 projecting to one side of wall 220. The ends of spring fingers 223 project below flange 224. Extending up from the edge of flange 224 are lips 225 centralized with the openings 221. The outer surfaces of lips 225 have small notches 226 centralized with respect to said lips and openings 221. At the opposite surface of wall 220, similar notches 226a are formed in opposed, aligned relation to the notches 226.

The bumps 201 of the spring fingers 200 at the bottom of receiver 165 snap into the opposed notches 226, 226a (FIGS. 10, 11) to hold the slide holder in one of two positions. Slide holder 170 can be reciprocated back and forth between alternate positions. In each position of the holder 170, one slide 171 is in position for viewing, while the other slide can be replaced.

The holder 170 can be easily inserted into the receiver from either end. The fingers 223 are always at the bottom. The ends of the fingers 223 strike the receiver as the holder is reciprocated. To remove the holder 170, the finger 223 at one end is pushed up to get the finger into the passage 202. Then the holder can be pulled out.

At opposite sides of each opening 221 are walls 230, 231 from which lips 230a, 231a, respectively, project in the plane of lips 225. Each slide is held in place by lips 225, 230a, 231a.

Extending from upper ends of walls 230, 231, are spring fingers 230b, 231b, respectively, to resiliently and frictionally engage the slides to hold them in place on the holder.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A film strip and slide viewer comprising a housing, lamp means in the housing, condenser lens means in the housing, means to position said condenser lens means to receiver rays from said lamp means, means removably mounted on said housing to removably support a photographic film strip in the housing in position for rays from the condenser lens means to pass through film on said film support means, projecting lens means in the housing, means to removably and clampingly support said projecting lens means in a first projecting position to receive an image from said film strip, means to removably and clampingly support said projecting lens means in a second projecting position to receive an image from a slide, a first mirror to reflect the image from the projecting lens means for viewing, means to removably position said mirror in a first position for film strip viewing, means to removably position another first mirror in a second position for slide viewing, said second position for said another first mirror being spaced from said first position for said first mirror, whereby when said means to support said film strip is removed, said viewer adaptably receives means to removably support a photographic slide holder, and said first mirror is removed from said first position and replaced by said another first mirror in said second position, and said projecting lens means is then removably positioned from its first projecting position to its second projecting position, so that the image of a slide is thereby projectionable.

2. The combination of claim 1, further comprising a second mirror, means to position said second mirror in the housing to reflect the image received from said first mirror, and a screen on said housing positioned to receive the image reflected by said second mirror.

3. The combination of claim 2, said housing comprising a bottom housing section and a top housing section interfitted thereon, said means for supporting said projecting lens means, and said means for positioning said first mirror being mounted in said bottom section, said means to position said second mirror and said screen being located in said top section.

4. The combination of claim 3, means to position said projecting lens means in a second projecting position spaced from its first projecting position in said bottom section, a second top housing section interfittable with said bottom section upon removing the first top housing therefrom, a mirror in said second top section, a second screen in said second top section, another mirror to replace the first mirror in the bottom section, and means to position said another mirror in said bottom section in spaced relation to the position of the first mirror in said bottom section upon first removing said first mirror, means to support a film slide holder removably mountable in said housing, to replace said photographic film strip support means, upon first removing said photographic film strip support means from said housing said another mirror in said bottom section, said mirror in said second top section and said screen in said second top section, being positioned to project an image received from the projecting lens means in its second projecting position, to said screen in said second top section, for projecting an image from slides in said slide support means onto said screen.

5. The combination of claim 4, said means to support a film strip in the housing, comprising means to receive said film strip support means, a film slide holder, a film slide holder receiving means, receivable in said film strip support means receiving means, upon first removing said film strip support means therefrom.

6. The combination of claim 1, said lamp means including a replaceable lamp, said housing and said lamp means being provided with cooperative interengaging means to rotatably and resiliently and releasably mount said lamp means on said housing, to permit said lamp means to move from a substantially vertical, closed, operative position of said lamp means, to a swing back, open inoperative position of said lamp means, to facilitate replacement of said replaceable lamp of said lamp means.

7. The combination of claim 6, and releasable means to lock said lamp means in closed operative position.

8. The combination of claim 1, said housing comprising top and bottom sections, said condenser lens assembly comprising a lens member, means on the bottom section to hold said lens member in a predetermined position, and means on the top section to hold the lens member down on the hold means of the bottom section.

9. The combination of claim 1, said means to support a film strip in the housing, comprising means to receive said film strip support means, a film slide holder, a film slide holder receiving means, receivable in said film strip support means receiving means, upon first removing said film strip support means therefrom.

10. The combination of claim 9, said film slide holder and film slide holder receiving means having mutually cooperative means to releasably retain said film slide holder in said film slide holder receiving means in a plurality of selective positions.

11. The combination of claim 5, said film slide holder and film slide holder receiving means having mutually cooperative means to releasably retain said film slide holder in said film slide holder receiving means in a plurality of selective positions.

12. The combination of claim 1, said housing comprising a bottom housing section, a top housing section interfitted thereon, said projecting lens assembly and first mirror and screen being mounted on said top section, means on said bottom section to support another mirror, in a different position and at an angle different from the angle and position of said first mirror, and said housing comprising means to support said projecting lens assembly in spaced positions, said housing further comprising a second top housing section interfittable with said bottom housing section upon removing said first top housing section therefrom a screen in said second top housing section, a mirror in said second top housing section, said projecting lens assembly in one position, said first mirror and said second mirror being arranged to project rays received by said projector lens assembly, in said one position to the screen in the first top housing section with said first top housing section interfitted on said bottom housing said another position thereof, to the screen on said second top housing section is interfitted with said bottom housing section.

13. The combination of claim 12, and means to finely adjust said projecting lens assembly in said one position thereof and in said another position thereof.

14. The combination of claim 8, said means to support said projecting lens means in a first projecting position in said housing and said means to support said projecting lens means in a second position, each including means to adjust the projecting lens relative to said housing.

15. The combination of claim 14, each of said adjust means including means to rotate said projecting lens means about its axis to focus said projected image.

* * * * *